(12) United States Patent
Lin et al.

(10) Patent No.: US 8,379,730 B2
(45) Date of Patent: Feb. 19, 2013

(54) METHOD FOR DETERMINING DISPLAY ORDER OF VOPS IN DECODER END OR MPEG IMAGE SYSTEM AND DEVICE FOR EXECUTING THE SAME

(75) Inventors: Chin-Long Lin, San Jose, CA (US); Ren-Yuh Wang, Cupertino, CA (US)

(73) Assignee: Sigmatel, Inc., Austin, TX (US)

( * ) Notice: Subject to any disclaimer, the term of this patent is extended or adjusted under 35 U.S.C. 154(b) by 980 days.

(21) Appl. No.: 12/406,765

(22) Filed: Mar. 18, 2009

(65) Prior Publication Data

US 2009/0175342 A1    Jul. 9, 2009

Related U.S. Application Data

(62) Division of application No. 10/614,409, filed on Jul. 4, 2003, now abandoned.

(51) Int. Cl.
*H04N 7/12* (2006.01)
(52) U.S. Cl. ................................ 375/240.25
(58) Field of Classification Search ............ 375/240.01, 375/240.25, 240.26; *H04N 7/12*
See application file for complete search history.

*Primary Examiner* — Young Lee
(74) *Attorney, Agent, or Firm* — Toler Law Group

(57) ABSTRACT

Methods and systems for image processing are provided. A particular method includes receiving a video object plane (VOP) at an image processing device and decoding the received VOP. The method also includes storing an order number of the decoded VOP at a P-VOP queue in a memory of the image processing device when the received VOP is a predictive coded VOP (P-VOP). The method further includes storing the order number of the decoded VOP at a first available location of a display ordered read queue in the memory of the image processing device when the received VOP is not a P-VOP.

11 Claims, 4 Drawing Sheets

| Inputs | | | | | Outputs | | | |
|---|---|---|---|---|---|---|---|---|
| drop_frame _decision | drop_frame _strobe | dec_wr_ vop_type | P_queue_ exist [T] | | Flag of P_queue [T+1] | P_queue | Flags of read_vo p_queue | read_vop_que ue |
| 0 | X | X | X | | same | same | same | same |
| 1 | 1 | I/B | X | | same | same | same | same |
| 1 | 1 | P | 0 | | 0 | same | same | same |
| 1 | 1 | P | 1 | | 0 | same | Add 1 more | Add P_queue_ content |
| 1 | 0 | I | 0 | | 0 | same | Add 1 more | Add wr_vop_ptr |
| 1 | 0 | I | 1 | | 0 | same | Add 2 more | Add P_queue_ content and wr_vop_ptr |
| 1 | 0 | P | 0 | | 1 | wr_vop_ ptr | same | same |
| 1 | 0 | P | 1 | | 1 | wr_vop_ ptr | Add 1 more | Add P_queue_ content |
| 1 | 0 | B | X | | same | same | Add 1 more | Add wr_vop_ptr |

FIG. 3 Truth table for decide_dec_rd_vop_ptr

| dec_wr_vop_type | Encoding order | dropped? | Flag of P_queue | P_queue_content | R[0] | R[1] | R[2] | R[3] | R[4] | R[5] | R[6] | R[7] | R[8] | R[9] | R[10] | R[11] |
|---|---|---|---|---|---|---|---|---|---|---|---|---|---|---|---|---|
| I-VOP | 0 |  | No | Don't care | 0 |  |  |  |  |  |  |  |  |  |  |  |
| P-VOP | 1 | No | No | Don't care | 0 |  |  |  |  |  |  |  |  |  |  |  |
| B-VOP | 2 | No | Yes | 1 | 0 | 2 |  |  |  |  |  |  |  |  |  |  |
| B-VOP | 3 | No | Yes | 1 | 0 | 2 | 3 |  |  |  |  |  |  |  |  |  |
| P-VOP | 4 | No | Yes | 1 | 0 | 2 | 3 | 1 |  |  |  |  |  |  |  |  |
| B-VOP | 5 | Yes | Yes | 4 | 0 | 2 | 3 | 1 |  |  |  |  |  |  |  |  |
| B-VOP | 5 | No | Yes | 4 | 0 | 2 | 3 | 1 | 5 |  |  |  |  |  |  |  |
| P-VOP | 6 | Yes | No | Don't care | 0 | 2 | 3 | 1 | 5 | 4 |  |  |  |  |  |  |
| B-VOP | 6 | No | No | Don't care | 0 | 2 | 3 | 1 | 5 | 4 | 6 |  |  |  |  |  |
| B-VOP | 7 | No | No | Don't care | 0 | 2 | 3 | 1 | 5 | 4 | 6 | 7 |  |  |  |  |
| P-VOP | 0 | No | Yes | 0 | 0 | 2 | 3 | 1 | 5 | 4 | 6 | 7 | 1 |  |  |  |
| B-VOP | 1 | No | Yes | 0 | 0 | 2 | 3 | 1 | 5 | 4 | 6 | 7 | 1 | 2 |  |  |
| B-VOP | 2 | No | Yes | 0 | 0 | 2 | 3 | 1 | 5 | 4 | 6 | 7 | 1 | 2 | 0 |  |
| I-VOP | 3 | No | No | Don't care | 0 | 2 | 3 | 1 | 5 | 4 | 6 | 7 | 1 | 2 | 0 | 3 |

FIG. 4   Evolution of P_queue and rd_vop_queue in the decoding process

METHOD FOR DETERMINING DISPLAY ORDER OF VOPS IN DECODER END OR MPEG IMAGE SYSTEM AND DEVICE FOR EXECUTING THE SAME

CLAIM OF PRIORITY

The present application claims priority from and is a divisional of U.S. patent application Ser. No. 10/614,409 filed on Jul. 4, 2003 and entitled "METHOD FOR DETERMINING DISPLAY ORDER OF VOPS IN DECODER END OR MPEG IMAGE SYSTEM AND DEVICE FOR EXECUTING THE SAME," the contents of which are expressly incorporated herein by reference in their entirety.

FIELD OF THE DISCLOSURE

The present disclosure is generally related image processing and, more particularly, to display order of video object planes (VOPs) of images.

BACKGROUND

Moving Picture Experts Group (MPEG) standards are in widespread use in the art of video and digital imaging. MPEG is the international committee that developed international standards (such as MPEG-1, MPEG-2 and MPEG-4) that made interactive video on CD-Rom and digital TV possible. In an MPEG image system, an image frame is constructed using video object planes or VOPs. In general, a frame is formed by a large amount of pixels generally including 8 bits, 16 bits, or 32 bits. For a frame with a size of 640×480 pixels where each pixel has 8 bits, there are a total 640×480×8 bits in the frame. If the image should be displayed with a rate of 60 frames per second, then there are 640×480×8×60 bits (about 147 Mbits) of data to be displayed in one second.

VOPs include three types, namely, intra coded or I-VOPs, predictive coded or P-VOPs, and bidirectional predictive coded or B-VOPs. For I-VOP, encoding and compression are performed using a single VOP. For P-VOP, encoding and compression of a VOP are performed in reference to a corresponding I-VOP. For B-VOP, encoding and compression of a VOP are performed in reference to the corresponding I-VOP and P-VOP. In the encoding order, the P-VOP is encoded and compressed before encoding the B-VOP such that the B-VOP can utilize the information of the P-VOP. The order of encoding VOPs is consequently different from the order of display.

The orders of encoding and display may not be as sophisticated as desired in meeting systems and scalability requirements in the art. Shortcomings are present when the encoding and display orders are improperly managed and constructed, which may negatively affect system and imaging performance. Insufficient memory or losses of VOPs in transmission further exacerbate these problems.

There is thus a general need for an efficient and optimal method and system of MPEG image processing overcoming at least the aforementioned shortcomings.

SUMMARY

A method for determining display order of VOPs in a decoder end of an MPEG image system and a device of executing the same are provided, where incoming VOPs are reordered so that the VOPs can be accordingly displayed. Thus, problems of insufficient memory or loss of VOPs in transmission may be overcome.

A particular method for determining the display order of VOPs in a decoding end of an MPEG image system is provided. The decoding end has a decoder for decoding incoming VOPs. A control logic unit has a memory for storing decoded VOPs for display. A first queue has a plurality of cells, and a second queue has one cell. The plurality of cells of the first queue is arranged with a first order to be read by a pointer for display. The method according to this particular embodiment includes arranging the first queue of a plurality of cells with a first order, providing the second queue of the single cell storing an order number, decoding the incoming video object planes (VOPs), determining whether the incoming VOPs are intra coded (I-VOPs), determining whether the incoming VOPs are predictive coded (P-VOPs), determining whether the incoming VOPs are bidirectional predictive coded (B-VOPs), and registering one of the plurality of cells of the first queue with a VOP incoming order for the incoming VOPs that are I-VOPs or B-VOPs.

The method can further include determining whether the single cell of the second queue is null. The method can also include registering one of the plurality of cells of the first queue next to one of the registered cells with the stored order number for the incoming VOPs that are P-VOPs if the single cell of the second queue is not null. The method can further include registering one of the plurality of cells of the first queue next to one of the registered cells with the stored order number for the incoming VOPs that are not I-VOPs and B-VOPs if the single cell of the second queue is not null. Moreover, the method can include registering the single cell of the second queue with the incoming VOP order for the incoming VOPs that are P-VOPs. The method according to further embodiments can include reading the decoded incoming VOPs according to the first order, or indicating whether any of the plurality of cells in the first queue is registered, or indicating whether the single cell of the second queue is registered.

Another embodiment provides an image processing device for determining a display order of incoming video object planes (VOPs) that are entering into a decoder according to an encoded order. The image processing device according to this particular embodiment includes control logic forming a VOP display order in response to the incoming VOPs and according to the encoding order; a VOP detector determining whether the incoming VOPs are intra coded (I-VOPs), predictive coded (P-VOPs), or bidirectional predictive coded (B-VOPs); and a counter counting a number of the incoming VOPs in response to the encoding order. Another embodiment of the image processing device can further include a first queue of a plurality of cells numbered with a first order, and a second queue of a single cell storing an order number. The image processing device according to other embodiments can also include a reader reading the incoming VOPs according to the first order, or at least one register registering one of the plurality of cells of the first queue with a VOP incoming order for the incoming VOPs that are I-VOPs and B-VOPs, or a flag indicating whether any of the plurality of cells in the first queue and the single cell of the second queue is registered, or an auxiliary VOP management unit providing parameters for dropping any of the incoming VOPs or for indicating memory sufficiency for storing the incoming VOPs. Furthermore, one or more of the plurality of cells of the first queue next to one of the registered cells in the at least one register can be registered with the stored order number for the incoming VOPs that are P-VOPs if the single cell of the second queue is not null. Moreover, one or more of the plurality of cells of the first queue next to one of the registered cells in the at least one register can be registered with the stored order number for the incoming VOPs that are not I-VOPs and B-VOPs if the single cell of the second queue is not null. Further, the single cell of the second queue can be registered with the incoming VOP order for the incoming VOPs that are P-VOPs.

Yet another embodiment provides an image processing system for determining a display order of incoming video object planes (VOPs). The image processing system according to this particular embodiment includes a decoder decoding and decompressing incoming video object planes (VOPs) entering the decoder according to an encoding order; control logic forming a VOP display order in response to the incoming VOPs and according to the encoding order; a VOP detector determining whether the incoming VOPs are intra coded (I-VOPs), predictive coded (P-VOPs), or bidirectional predictive coded (B-VOPs); and a counter counting a number of the incoming VOPs in response to the encoding order. Another embodiment of the image processing system can further include a first queue of a plurality of cells numbered with a first order, and a second queue of a single cell storing an order number. Yet another embodiment of the image processing system can also include a memory storing the incoming decoded VOPs, such as random access memory (RAM), dynamic random access memory (DRAM), static random access memory (SRAM) or flash memory. The image processing system according to other embodiments can also include a reader reading the incoming VOPs according to the first order, or at least one register registering one of the plurality of cells of the first queue with a VOP incoming order for the incoming VOPs that are I-VOPs and B-VOPs, or a flag indicating whether any of the plurality of cells in the first queue and the single cell of the second queue is registered, or an auxiliary VOP management unit providing parameters for dropping any of the incoming VOPs or for indicating memory sufficiency for storing the incoming VOPs. Furthermore, one or more of the plurality of cells of the first queue next to one of the registered cells in the at least one register can be registered with the stored order number for the incoming VOPs that are P-VOPs if the single cell of the second queue is not null. Moreover, one or more of the plurality of cells of the first queue next to one of the registered cells in the at least one register can be registered with the stored order number for the incoming VOPs that are not I-VOPs and B-VOPs if the single cell of the second queue is not null. Further, the single cell of the second queue can be registered with the incoming VOP order for the incoming VOPs that are P-VOPs.

BRIEF DESCRIPTION OF THE DRAWINGS

Other features and advantages will become apparent by way of the following detailed description. The description is made with reference to the accompanied drawings (not necessarily drawn to scale) in which:

FIG. 3 is an exemplary truth table of the method according to a particular embodiment; and FIG. 4 is an exemplary evolution table of the method according to a particular embodiment of a decoding process.

DETAILED DESCRIPTION

Figure 1:
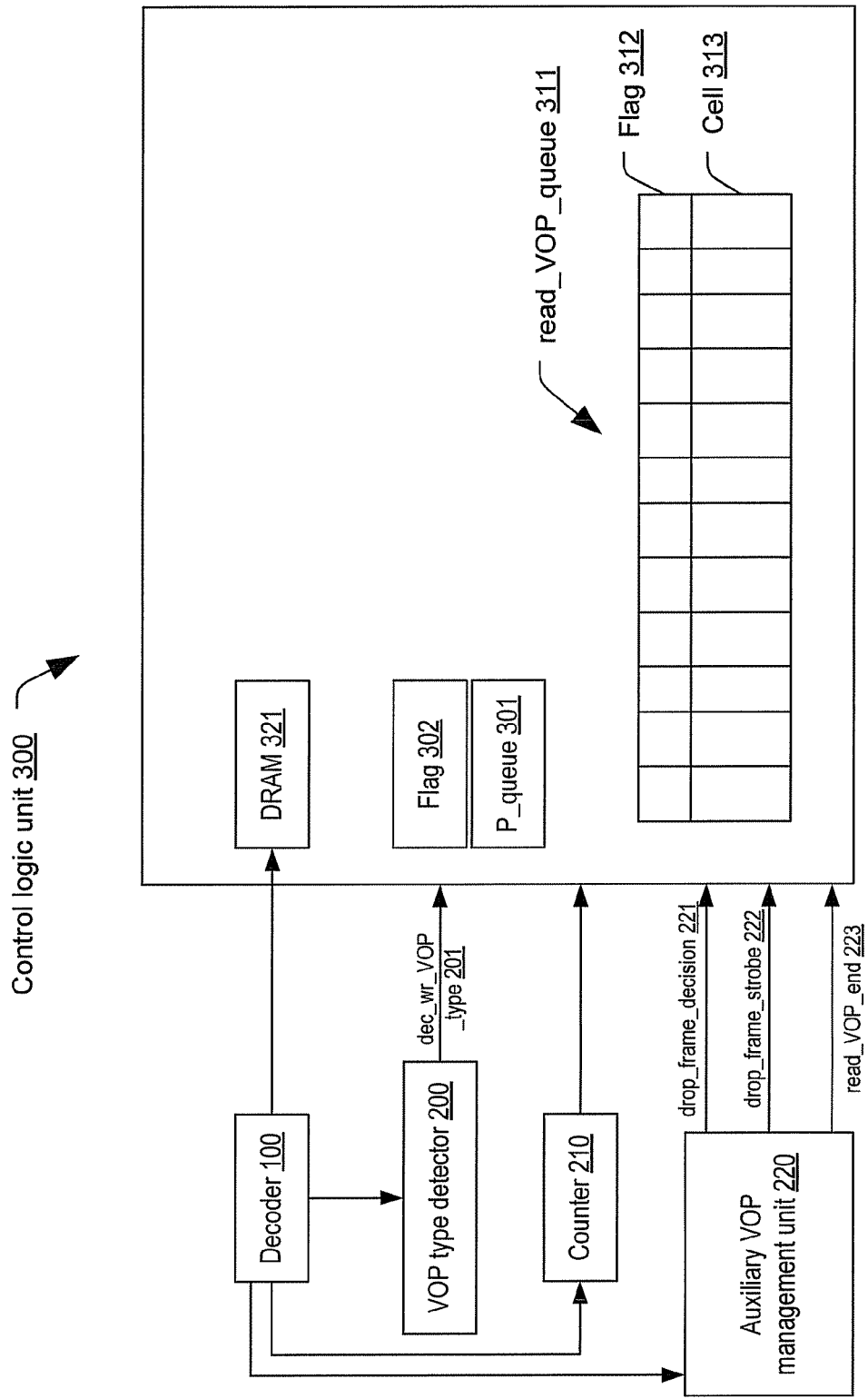
FIG. 1 is a block diagram illustrating a particular embodiment of a system and device.

The methodology introduced here is to write a series of VOPs into DRAM in the decoding order and read it back in the display order.

At the encoding end, a first VOP (Video Object Plane) is "Intra"-encoded and compressed to get an I-VOP. Then the I-VOP is decompressed to get a decompressed I-VOP, which is subsequently utilized as a reference VOP in encoding a P-VOP. The decompressed I-VOP is slightly different from the original, non-encoded and non-compressed VOP since the compression process losses some bits. Thereby, when it is decompressed, these lost bits cannot be reconstructed and thus to some extent, a distortion is induced. However, from the viewpoint of visual sense, this distortion will not affect the view and be detected by the eyes of the viewer. Then the encoding end takes a third VOP and predicatively encodes and compresses the third VOP with reference to the former decompressed I-VOP to obtain a P-VOP. The P-VOP is decompressed to get a decompressed P-VOP (a first P-VOP). The decompressed P-VOP has some distortion from the original uncompressed third VOP. The distortion in the decompressed P-VOP is larger than that of the decompressed I-VOP due to the multiple effects of distortions from the decompressed I-VOP and P-VOP. The encoding end takes a second VOP for encoding and compression with reference to the decompressed I-VOP and P-VOP to form a bidirectional-VOP (a first B-VOP). These VOPs are transferred from the encoding end to a decoding end sequentially. The transfer order is the first VOP (I-VOP), the third VOP (P-VOP) and the second VOP (B-VOP). It should be noted that the transfer order is not the actual image display order. This is because the B-VOP uses information of a later VOP so that the encoding end encodes and compresses the third VOP in advance, causing the transfer order to be different than the actual image display order.

The encoding end encodes and compressed a fifth VOP to get a second P-VOP with reference to the first P-VOP (similarly, it is decompressed). The encoding end takes a fourth VOP to encode and compress the VOP with reference to the first and second P-VOPs (similarly, they are decompressed).

In encoding and compressing a P-VOP, the former I-VOP (in the initial end of the sequence) or a former P-VOP is used as a reference. In encoding and compressing a B-VOP, the former I-VOP and P-VOP or two former P-VOPs are utilized as references. As a consequence, if incoming VOPs are numbered in time with the order of VOP1, VOP2, VOP3, VOP4, VOP5, VOP6, VOP7, etc, then the encoding order (i.e., image frame transfer order) are sequentially VOP1 (an I-VOP), VOP3 (a P-VOP), VOP2 (a B-VOP), VOP5 (a P-VOP), VOP4 (a B-VOP), VOP7 (a P-VOP), VOP6 (a B-VOP), etc. The process is repeated until an admitted distortion threshold is exceeded. Then the sequence is re-initialized, i.e., an incoming VOP is encoded and compressed as an I-VOP and the same process is repeated so as to get a sequence of I-VOP, P-VOP, B-VOP, P-VOP, B-VOP, P-VOP, B-VOP, etc.

MPEG allows multiple B-VOPs to be formed between an I-VOP and a P-VOP or between two P-VOPs. In that, each B-VOP is encoded and compressed with the former I-VOP (or P-VOP) and a latter P-VOP. Referring to the above example of the VOP order, the encoding order (image frame transfer order) in this case is sequentially VOP1 (an I-VOP), VOP4 (a P-VOP), VOP2 (a B-VOP), VOP3 (a B-VOP), VOP7 (a, P-VOP), VOP5 (a B-VOP), VOP6 (a B-VOP), etc. It is seen that the P-VOP is encoded in advance for use in encoding the two B-VOPs.

It is apparent that more B-VOPs can be formed between two P-VOPs, but the more the B-VOPs, the larger the distortion of the encoded VOP. However, the way of encoding VOPs into I-VOPs, P-VOPs, and B-VOPs are helpful in the reduction of transmission bits. In general, the total bits of a P-VOP are only one tenth of an I-VOP and a B-VOP is several tenth of the P-VOP. Thus, the compression using I-VOP, P-VOP, and B-VOP may greatly reduce the transmission bit number. Further, for high-resolution images, if the images are not greatly compressed, it is difficult to display the images in real time since the bits to be transferred are too large to be transmitted and processed effectively.

It is seen from the above description that the VOP transmission order is not the same as the image frame display order. Thereby, as these VOPs are to be displayed, they must be reordered to the original image frame display order.

In the decoding end, the incoming encoded and compressed VOPs are firstly decoded according to the receiving order (namely, the transmission order). Then, they are stored to a memory (for example, a DRAM) for displaying.

In general, a decompressed VOP possibly occupies a memory space of 5 Mbytes (this data is closely related to the resolution of the image), while in most of the currently used display systems, the display frame rate per second is about 30 (frames/sec). Therefore, it is apparent that a DRAM may be insufficient to store sufficient VOPs for display. As a consequence, it is desirable to effectively program the DRAM and determine a method to define the relations of the VOPs in the DRAM and VOPs to be displayed. As described above, the VOPs encoding order (transfer order) is not the same as that the display order, but at the decoding end, the decoder decodes the VOPs according to the receiving sequence, i.e., based on the transfer order.

The way of using one B-VOP for each one P-VOP as illustrated above is employed as an example for describing the method of a particular embodiment. In this case, the transfer order is sequentially VOP1 (an I-VOP), VOP3 (a P-VOP), VOP2 (a B-VOP), VOP5 (a P-VOP), VOP4 (a B-VOP), VOP7 (a P-VOP), VOP6 (a B-VOP), etc., but the display order is sequentially VOP1, VOP2, VOP3, VOP4, VOP5, VOP6, VOP7 . . . as illustrated in the following Table 1.

| Transferring order (encoding order, decoding order) | Display order |
|---|---|
| VOP1 | VOP1 |
| VOP3 | VOP2 |
| VOP2 | VOP3 |
| VOP5 | VOP4 |
| VOP4 | VOP5 |
| VOP7 | VOP6 |
| VOP6 | VOP7 |
| . . . | . . . |

FIG. 1 is a block diagram illustrating a system and device according to a particular embodiment. A decoder 100 is used to decode the incoming VOPs from the receiver (not shown), which serves to receive the VOP from the transmitting end. A control logic unit 300 defines two queues, which are a read_VOP_queue 311 and a P_queue 301. The read_VOP_queue 311 contains a number of cells 313 with each cell having a respective flag 312. Each cell in the read_VOP_queue 311 is used to indicate the display order of the corresponding VOPs stored in the memory. The flag 312 serves to indicate the condition of the cell 313, for example, a flag of 1 indicates that the cell 313 of the read_VOP_queue 311 is active and a flag of 0 indicates that the cell 313 of the read_VOP_queue 311 is inactive. Thereby, the pointer is unnecessary to be pointed to an inactive cell. The control logic unit 300 has a P_queue 301. The P_queue 301 has only one cell, which stores the condition of an incoming P-VOP. Likewise, the P_queue 301 has a flag 302 for showing the activity of the P_queue 301. That is, for example, a flag of 1 indicates that the P_queue 301 is active and a flag of 0 indicates that the P_queue 301 is inactive. The control logic unit 300 generates a Current_read_VOP_pointer (not shown) and a Next_read_VOP_pointer (not shown). The Current_read_VOP pointer indicates the VOP to be read now and the Next_read_VOP_pointer indicates the VOP to be read next. Thereby, the display end can know the VOPs to be read.

The control logic unit 300 further includes a memory. In this embodiment, a DRAM 321 is used as an example of the memory, while other memory suitable for this object can be used. The DRAM has a finite capacity of storing some VOPs, for example, eight VOPs. Since the capacity of the DRAM is finite, the VOPs stored are also finite.

A VOP type detector 200 serves to detect the type of an incoming VOP, which is indicated in the header of the VOP bit stream. The VOP type detector outputs a dec_wr_VOP_type 201, which indicates the type of the incoming VOP.

A counter 210 serves to count the number of the incoming VOP so as to be used as a reference number in processing the incoming VOPs.

An auxiliary VOP management unit 220 serves to provide some parameters which are helpful in decision making regarding the display order. The auxiliary VOP management unit 220 determines three parameters from the incoming data stream. The first one is a drop_frame_decision parameter 221 which indicates whether a decoded VOP is to be dropped out in response to a condition that the memory space is insufficient to store a complete frame. Generally, the auxiliary VOP management unit 220 makes this decision immediately after one VOP is written into the DRAM 321. Thus, the drop_frame_decision parameter 221 is active only at the end of decoding a VOP, otherwise it is inactive. If the DRAM 321 is full of data (which can be known from a drop_frame_strobe parameter 222 described below), then drop_frame_decision parameter 221 gives a message that the incoming decoded VOP is to be dropped since no memory space is available for storing this VOP. However, if the DRAM 321 has sufficient space to store the incoming VOP, the drop_frame_decision parameter 221 is inactive. The second parameter given by the auxiliary VOP management unit is the drop_frame_strobe parameter 222. The drop_frame_strobe parameter 222 indicates the condition of the memory of the control logic unit 300. For example, if the memory is full, then the drop_frame_strobe parameter 222 is set as 1, which indicates that no VOP can be written into the memory. On the other hand, if the memory has a sufficient space for storing another VOP, then the drop_frame_strobe parameter 222 is set as 0 indicating that the incoming VOP does not need to be dropped. Therefore, the drop_frame_decision parameter 221 indicates whether a VOP is to be dropped based on the value of the drop_frame_strobe parameter 222 and takes an action to drop or write the incoming decoded VOP accordingly. The third parameters given by the auxiliary VOP management unit 220 is a read_VOP_end parameter 223, which indicates that no VOP will be sent to the drop_frame_decision parameter 221 and thus the last one VOP stored in the DRAM must be displayed once more to avoid no image frame being displayed at the display screen. Thereby, the read_VOP_end parameter 223 has a function which is opposite to the drop_frame_decision parameter 221.

The logic indicates that if an incoming decoded VOP is an I-VOP or a B-VOP, then the incoming VOP is stored in the DRAM 321, and a designated cell in the read_VOP_queue 311 will store the encoding order of the incoming VOP and a flag associated with the cell will indicate that the cell is active by setting the flag to be 1. If the incoming VOP is a P-VOP, then the VOP is stored in the DRAM 321, and the cell of the P_queue 301 stores the order of the P-VOP until the next P-VOP is stored in the DRAM 321 or until no P-VOP enters the decoding end when the decoding end predicts that a P-VOP should enter the decoding end according to transfer sequence logic known in the decoding end. As the next P-VOP is stored in the DRAM 321 or no P-VOP enters into the decoding end, the indication in the cell of the P_queue 301 is transferred into the read_VOP_queue 311 to be used as a number of the display order. Thereby, the display order can be determined by the logic.

Figure 2:
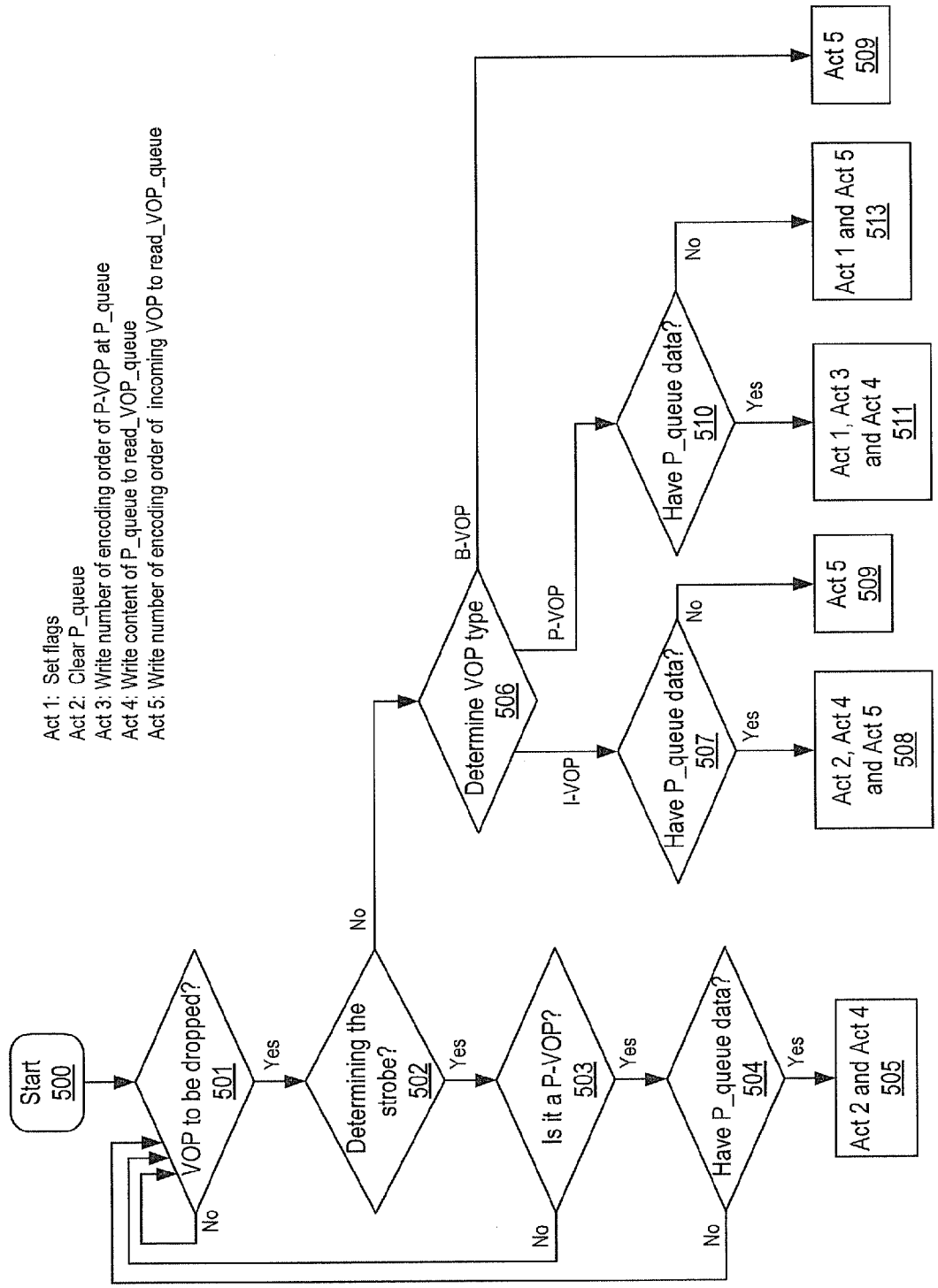
FIG. 2 is a flow diagram illustrating a method according to a particular embodiment.

FIG. 2 is a flow diagram illustrating a method according to a particular embodiment. The process is started at 500 and initiated at 501. In 501, the VOP type detector 200 determines whether the drop_frame_decision parameter is 1 (namely, a clock indicates the end of decoding an incoming VOP). If not, i.e., the decoder 100 is now decoding a VOP, then the process is repeated until the system finds that the clock is at the end of decoding a VOP. If so, the process enters into 502. In 502, the auxiliary VOP management unit 220 determines whether the drop_frame_strobe is equal to 1. If so, it represents that the memory space is full, i.e., no new VOP can be written into the memory. Then the process enters into 503. At 503, the VOP type detector 200 determines whether the incoming VOP is a P-VOP. If not, the process returns to 501 for determining whether other incoming VOP needs to be dropped, otherwise the process enters into 504. In 504, the control logic unit 300 determines whether the P_queue has been set. If so, 505 is performed, that is, the P_queue is cleared and the original setting value in the P_queue is transferred to read_VOP_queue. Otherwise, the process returns to 501 for waiting the end of decoding an incoming VOP. If in 502, the drop_frame_strobe is not set, then it represents that the incoming decoded VOP can be stored in the memory and then be displayed. The process then enters into 506, where the VOP type detector 200 determines the type of incoming VOP. If the incoming VOP is an I-VOP, it represents that the incoming I-VOP must be written into the read_VOP_queue and the original data in the P_queue is transferred to the read_VOP_queue. At 507, the control logic unit 300 checks whether the P_queue has been set. If so, the P_queue is set as 0 (inactive), the content originally stored in the P_queue is written to the read_VOP_queue and the number of the encoding order of the incoming VOP is written into the read_VOP_queue (at 508). If in 507, the content of P_queue is null, only the number of the encoding order of the incoming VOP is written into the read_VOP_queue (at 509). If in 506, the incoming VOP is a P-VOP, then the control logic unit 300 determines whether the content of the P_queue is not null (at 510). If so, the P_queue is stored with the number of the encoding order of the P-VOP. The content originally stored in the P_queue is written to the read_VOP_queue. The related flags in the P_queue and read_VOP_queue are set (at 511). If in 510, the content of the P_queue is null, then only the number of the encoding order of the P-VOP is written to the read_VOP_queue and set the related flag (at 512). If in 506, the incoming VOP is a B-VOP, then the number of the encoding order of the B-VOP is written into the read_VOP_queue (at 513).

FIG. 4 is an exemplary evolution table of the method according to a particular embodiment. At first, the decoder decodes an incoming frame, which is for example, an I-VOP. Then the first cell in the read_VOP_queue is set as 0 (R[0]=0) which shows the encoding order of the incoming VOP. The P_queue has no action. Then the second incoming VOP is a P-VOP. Thereby, the P_queue is active (Yes) to illustrate a P-VOP is now at standby condition. Although the P-VOP is stored in the DRAM, the read_VOP_queue has no message about the P-VOP. That is to say that this P-VOP is currently not in the display order. In the fourth line of the evolution table of FIG. 4, a B-VOP is decoded and transferred to the DRAM, then the second cell in the read_VOP_queue is set as 2 (R[1]=2), which is the order of this B-VOP in the transferring sequence. Next another B-VOP enters into the decoding end. The same result is obtained so that (R[2]=3). Next in the sixth line of Table, it is illustrated that another P-VOP enters into the decoding end. Thereby, the P_queue will be active. Namely, the P_queue will send the former order number stored in the P_queue to the read_VOP_queue, causing the R[3]=1 (which is the incoming order of the first P-VOP), while the order number of the second P-VOP is stored in the cell of the P-VOP for waiting for the next incoming P-VOP. At the next line, it is illustrated that a B-VOP enters into the decoding end, and the system decides to drop this B-VOP. Thus the read_VOP_queue and P_queue are unchanged. The same process is executed for the conditions illustrated in the following lines of the evolution table of FIG. 4 and the results are illustrated in FIG. 4.

FIG. 3 is an exemplary truth table of the method according to a particular embodiment of the decoding process. For the example illustrated in the first line of the truth table, it is shown that there is no incoming VOP, and thus the conditions for the output side are remained-unchanged and same as the former ones.

For the example illustrated in the second line of the truth table in FIG. 3, the type of the incoming VOP is an I-VOP (or a B-VOP), as illustrated in the third column of the input side. The drop_frame_strobe is 1, that is, the incoming VOP will not be displayed. Thus, the read_VOP_queue and the flag thereof are the same as the former ones since no VOP will be added to the DRAM and thus the read_VOP_queue does not need to do anything.

For the case illustrated in the third line of the truth table, it is illustrated that the incoming VOP is a P-VOP, but the system decides not to display this VOP due to the space in the memory being insufficient to store the incoming VOP. Thereby, it is shown that in the output side, the P_queue and flag thereof remains unchanged since the incoming P-VOP will not be displayed.

For the case illustrated in fourth line of the table; it is illustrated that the incoming VOP is a P-VOP and the system decides not to store it. Then, in the output end, it is shown that the P_queue and the flag thereof remain unchanged, but the read_VOP_queue and the flag thereof are changed since the data in the P_queue is written to the read_VOP_queue.

Although the disclosure has been described with reference to particular embodiments, it will be understood that the disclosure is not limited to the details described thereof. Substitutions and modifications have been suggested in the foregoing description, and others will occur to those of ordinary skill in the art. In particular, the method may include methods having substantially the same process to achieve substantially the same result. Therefore, all such substitutions and modifications are intended to be within the scope of the disclosure as defined in the appended claims and their equivalents.

What is claimed is:
1. A method, comprising:
receiving a video object plane (VOP) at an image processing device;
decoding the received VOP to generate a decoded VOP;
determining whether a memory of the image processing device that is storing one or more VOPs has available capacity to store the decoded VOP;

when the memory does not have the available capacity to store the decoded VOP and the decoded VOP is a predictive coded VOP (P-VOP):
  discarding a previously received P-VOP when an order number of the previously received P-VOP is stored at a P-VOP queue; and
  storing an order number of the decoded VOP at the P-VOP queue;
when the memory does have the available capacity to store the decoded VOP and the decoded VOP is a P-VOP, storing the order number of the decoded VOP at the P-VOP queue in the memory of the image processing device; and
when the memory does have the available capacity to store the decoded VOP and the decoded VOP is not a P-VOP, storing the order number of the decoded VOP at a first available location of a display ordered read queue in the memory of the image processing device.

2. The method of claim 1, further comprising determining whether the order number of the previously received P-VOP is stored at the P-VOP queue based on a P-VOP queue flag that indicates whether the order number is stored at the P-VOP queue.

3. The method of claim 2, further comprising, when the order number of the previously received P-VOP is stored at the P-VOP queue, storing the order number of the previously received P-VOP at the first available location of the display ordered read queue before storing the order number of the decoded VOP at the P-VOP queue.

4. The method of claim 1, further comprising setting a P-VOP queue flag in response to storing the order number of the decoded VOP at the P-VOP queue.

5. The method of claim 1, further comprising reading a plurality of stored VOPs from memory according to an order of the order numbers stored at the display ordered read queue.

6. The method of claim 1, further comprising, when the memory does not have available capacity to store the decoded VOP and the decoded VOP is not a P-VOP, discarding the decoded VOP.

7. A non-transitory processor-readable medium storing instructions that, when executed by a processor, cause the processor to:
  receive a video object plane (VOP);
  decode the received VOP to generate a decoded VOP;
  determining whether a memory of an image processing device that is storing one or more VOPs has available capacity to store the decoded VOP;
  when the memory does not have the available capacity to store the decoded VOP and the decoded VOP is a predictive coded VOP (P-VOP):
    discarding a previously received P-VOP when an order number of the previously received P-VOP is stored at a P-VOP queue; and
    storing an order number of the decoded VOP at the P-VOP queue;
  when the memory does have the available capacity to store the decoded VOP and the decoded VOP is a P-VOP, store an order number of the decoded VOP at the P-VOP queue in a memory; and
  when the memory does have the available capacity to store the decoded VOP and the decoded VOP is not a P-VOP, store the order number of the decoded VOP at a first available location of a display ordered read queue in the memory.

8. The non-transitory processor-readable medium of claim 7, wherein the received VOP is a P-VOP, an intra coded VOP (I-VOP), or a bidirectional predictive coded VOP (B-VOP).

9. The non-transitory processor-readable medium of claim 7, further comprising instructions that, when executed by the processor, cause the processor to determine whether the order number of the previously received P-VOP is stored at the P-VOP queue based on a P-VOP queue flag that indicates whether the order number is stored at the P-VOP queue.

10. The non-transitory processor-readable medium of claim 9, further comprising instructions that, when executed by the processor, cause the processor to store the order number of the previously received P-VOP at the first available location of the display ordered read queue before storing the order number of the decoded VOP at the P-VOP queue when the order number of the previously received P-VOP is stored at the P-VOP queue.

11. The non-transitory processor-readable medium of claim 7, further comprising instructions that, when executed by the processor, cause the processor to read a plurality of stored VOPs from memory according to an order of order numbers stored at the display ordered read queue.

* * * * *